Nov. 10, 1970     A. J. MALLING     3,538,616

MOISTURE EXTRACTING AND DRYING APPARATUS

Filed Sept. 6, 1968     2 Sheets-Sheet 1

INVENTOR.
ALFRED J. MALLING
BY M. A. Hobbs
ATTORNEY

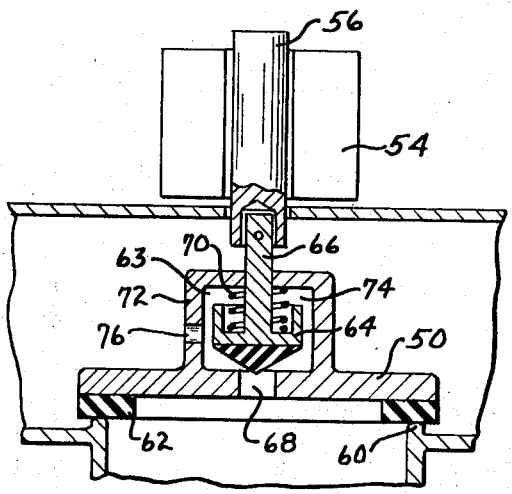
FIG. 2
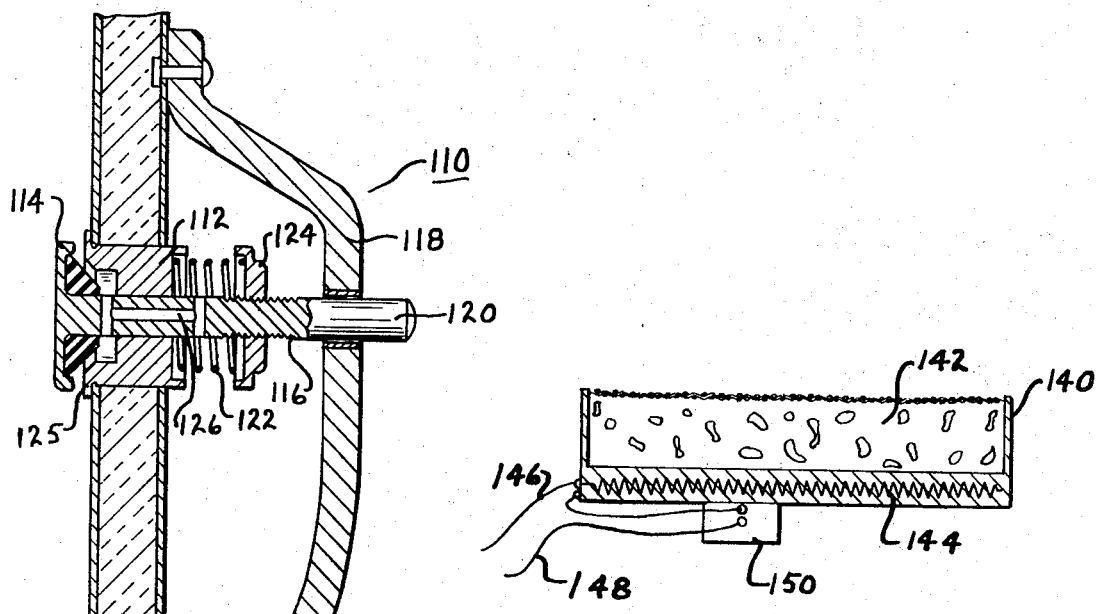
FIG. 3
FIG. 4
INVENTOR.
ALFRED J. MALLING
BY M. A. Hobbs
ATTORNEY

*United States Patent Office*

3,538,616
Patented Nov. 10, 1970

3,538,616
MOISTURE EXTRACTING AND DRYING APPARATUS
Alfred J. Malling, 902 Woodside,
South Bend, Ind. 46614
Filed Sept. 6, 1968, Ser. No. 758,069
Int. Cl. F26b 23/06
U.S. Cl. 34—92                            10 Claims

ABSTRACT OF THE DISCLOSURE

A moisture extracting and drying apparatus having a housing with an enclosed chamber and a door therefor, in which an electrical heating device heats the air in the chamber and the material placed therein for driving off the excess moisture which is dissipated through an opening in or near the top of the housing. The heat generating means and a means for operating the opening and closing of the vent are controlled by an electrical system responsive to temperatue and humidity in the chamber.

---

In the home during the warm and humid months of the year and in warm, moist climates, food such as cerial, chips, crackers, bread, flour and sugar, for example, become excessively moist and often spoil, lose their flavor, or become difficult to store, handle and use. In the past when these materials became excessively moist, they were often discarded or heated in an oven until the excess was driven from the material. The heating practice usually left the material with an unpleasant scorched taste and, since the materials were returned to their original storage places, they soon returned to the excessively moist condition. Attempts have been made to provide packages or other containers which tend to seal out the moisture and retain the materials in a fresh condition, but these containers rarely perform the sealing function effectively once they have been opened. Further, even with containers which can be effectively resealed, occasional opening and closing to remove some of the contents expose the materials to excess humidity and render the sealed container ineffective to protect the contents from excess moisture. It is therefore one of the principal objects of the present invention to provide a moisture extracting and drying apparatus which will effectively drive off excess moisture from materials of the foregoing type and from a variety of other substances, and which will maintain those materials and substances in a relatively dry condition ready for immediate use for an indefinite period of time.

Another object of the invention is to provide a moisture control apparatus for conditioning and storing materials in a fresh, relatively dry condition, which automatically responds to an increase in moisture to become operable to reduce the moisture content of the materials in the storage compartment thereof, and which is so constructed and arranged that the materials can readily be removed from and returned to the compartment without interfering appreciably with the condition of other materials stored in the compartment.

Still another object is to provide an apparatus of the aforesaid type which can easily be installed and used in a conventional home kitchen, and which is economical to use and maintain.

A further object of the invention is to provide an automatic moisture control apparatus which is relatively simple in construction and operation and which, when portable, is compact, safe and easily operated and regulated, and which is of such size that it can be moved conveniently and maintained in a sanitary and vermin proof condition.

Another object is to provide an apparatus of the foregoing type which can be built in as an integral part of the kitchen cabinet, either in new construction of in remodeled structures.

Additional objects and advantages of the present invention will become apparent from the following description and accompanying drawings, wherein:

FIG. 2 is an enlarged fragmentary cross sectional view showing in greater detail the vent valve structure;

FIG. 3 is a fragmentary enlarged cross sectional view of the door release mechanism, handle, and portion of the chamber door; and FIG. 4 is a vertical cross sectional view of a device constituting a modified form of the present invention.

Figure 1:
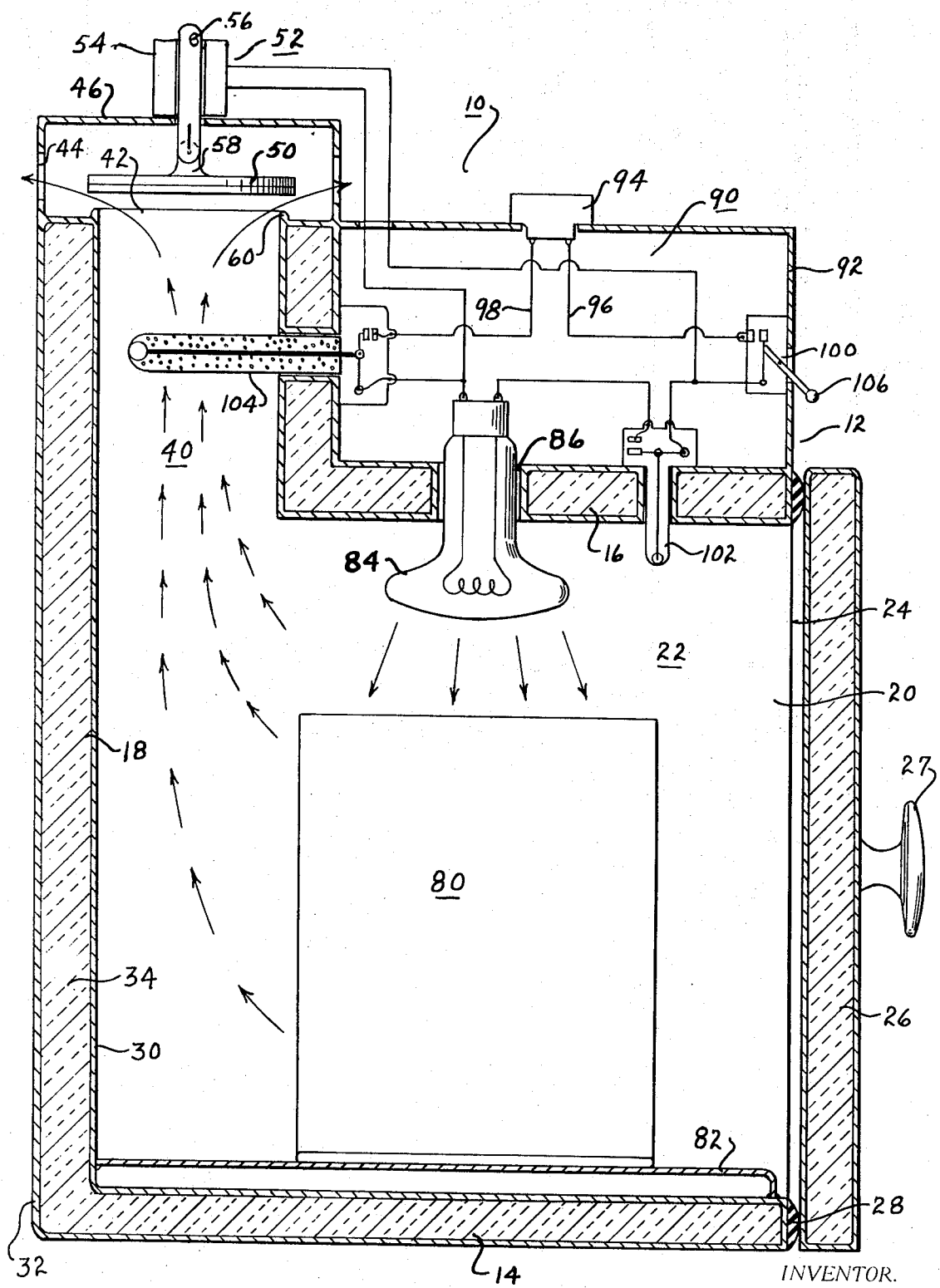
FIG. 1 is a vertical cross sectional view of a moisture extracting and drying apparatus embodying the present invention.

Referring more specifically to the drawings and to FIG. 1 in particular, numeral 10 designates generally the present moisture extracting and drying apparatus which consists of a housing 12 having a bottom 14, top 16, a back wall 18 and opposed sides 20, only one of which is shown in the drawings. The bottom, back, sides and top are preferably joined integrally to one another to form an enclosed chamber 22 for receiving and storing materials to be conditioned by the present apparatus. An opening 24 to chamber 22 is closed by a door 26, preferably hinged at one edge so that it can swing open and closed freely as it is operated by handle 27. A gasket 28 is preferably interposed between the door and the edge of the top, bottom and two side walls, and the door may be magnetically closed by any suitable and well known means which does not interfere with the easy opening of the door. The walls, top, bottom and door are preferably insulated to minimize internal condensation, the construction shown in the drawings consisting of an internal wall 30 of sheet metal or other suitable material, an external sheet metal wall 32, and a layer of insulation material 34 between the two sheet metal walls, the walls being of sufficient strength to withstand the differential in pressure between the chamber and the atmosphere. This type of construction is essentially standard, and will not be described further herein.

A vent stack 40 extends upwardly from chamber 22 through top 16, and has a port 42 at the top communicating with the atmosphere through holes 44 in cap 46 disposed over port 42. The latter opening is closed by a lid 50 operated between closed and opened position by a solenoid 52 consisting of a coil 54 and a plunger 56. The plunger is connected to lid 50 by a neck 58. When the coil is energized, plunger 56 is moved upwardly, thereby opening port 42 to permit the moist air to escape from the chamber through stack 40. Lid 50 seats on lip 60 at the upper periphery of stack 40 and an effective seal is provided by gasket 62. As shown in FIG. 2, a pilot valve 63 is incorporated in lid 50 to relieve the vacuum in chamber 22 in order to facilitate opening of the lid. This pilot valve consists of a valve element 64 connected to plunger 56 by a stem 66, and the valve element is seated over an orifice 68 by a coil spring 70 reacting between the inner surface of a housing 72 and the upper surface of valve element 64. Chamber 74 in housing 72 is connected with the atmosphere by a port 76 in the side wall of the housing. When the solenoid is energized, valve element 64 is raised, thereby opening port 68 to admit air through orifice 68 into stack 40 and chamber 22 to relieve the vacuum therein, and thereby permit the lid to be easily opened.

The material 80 to be dried, which may consist of cereal, potato chips, crackers, flour, salt, sugar, etc., is placed in chamber 22 on a rack 82, which is perforated and spaced from the upper surface of bottom 14 to permit air to circulate effectively around the material, which is normally in a package or other suitable container. The material and the air in chamber 22 are heated by an infrared lamp 84 of conventional construction, extending downwardly from opening 86 in top 16. The lamp directs its rays onto the container or containers for the material to be conditioned and onto the inside surfaces of the walls, door, back and bottom of the housing, thus heating the air in chamber 22 and driving the moisture from the material in the container. As the air becomes warm, it expands, and the excess air in the chamber flows outwardly through port 42, some of the air being replaced by a small inward flow of air through port 42. The temperature in chamber 22 may vary over a substantial range, with the maximum temperature preferably not being higher than about 200° F.

The operation of lamp 84 is controlled by an electrical circuit indicated generally by numeral 90 contained in a cover 92. The circuit consists of a main connector 94, and main leads 96 and 98, into which a manual switch 100, a thermostat 102 and a humidity sensing switch 104 are connected in series with the lamp. The manual switch is controlled by a lever 106 which can readily be reached by an operator externally of the apparatus. The control switch, thermostat, and the humidity sensing switch are conventional in construction and operation and hence will not be described in detail herein. The thermostat senses the temperature and the humidity sensing element senses the moisture in the air in chamber 22 to energize and deenergize lamp 84. The thermostat is normally set to interrupt the operation of the lamp when the temperature reaches approximately 200 degrees. The humidity sensing device or switch operates to turn on and turn off the lamp within a range, for example, of ten percent maximum humidity and five percent minimum humidity. Since the thermostat may interrupt the operation of lamp 84 before the moisture has been fully driven from the material and from chamber 22, lid 50 is retained opened in response to the humidity sensing switch, independently of the thermostat, so that the lid may remain open after the lamp has been turned off. However, port 42 is closed by lid 50 when the air in chamber 22 has been dehumidified to the desired degree.

In order to facilitate opening of door 26, a pilot release valve is preferably incorporated in the handle structure 110 illustrated in FIG. 3. A pilot valve 112 is mounted in the door and contains a valve element 114 operated by a stem 116 which extends through the door and through a pull handle 118. An extension 120 of the stem provides a thumb operated means for opening valve 114 against the force of coil spring 122 reacting between a spring retainer 124 on stem 116 and the adjacent surface of a rigid insert 125. The stem 116 contains a passage 126 which communicates with chamber 22 and with the atmosphere when valve element 114 is moved inwardly, i.e., in the open direction, by the operation of stem 116. When the valve is opened, the vacuum created by the cooling of the previously heated air is released so that there will be no substantial resistance to opening the door. Another function of this valve mechanism is to provide an automatic means of setting any desired chamber vacuum between the maximum chamber vacuum possible and ambient pressure. Adjusting screw 124 controls the opening point of valve 114 to hold some desired pressure difference between the chamber pressure and ambient pressure. In some cases it may be desirable to maintain a chamber pressure at or close to ambient pressure.

In the operation of the present apparatus, the material to be conditioned is placed in chamber 22 on rack or tray 82 and the manual switch 100 is closed. This completes the circuit through the thermostat 102, lamp 84, and humidity sensing switch 104, and energizes solenoid 52, which raises lid 50. As lamp 84 operates, it drives the moisture from the material 80 and simultaneously heats the air in chamber 22. The air thus expands and flows outwardly through ports 42 and 44 to the atmosphere. A small amount of return air may also flow downwardly through stack 40. When the temperature reaches approximately 200 degrees, the lamp will be turned off, and unless the moisture in the material and in the air in chamber 22 and stack 40 has decreased to the desired minimum level, the lid 50 remains raised. As the temperature decreases, for example ten degrees or so, the thermostatic switch again closes, thus reenergizing lamp 84 to continue the heating and drying operation. This cycle continues until the moisture in the air sensed by the humidity switch is reduced to the desired level. When this point is reached, the entire system is de-energized and lid 50 firmly closes port 42. The temperature of the air in chamber 22 then gradually cools to approximately the ambient temperature and the cooling of the air creates a vacuum in the chamber, which will remain for an extended period of time unless door 26 is opened, thus maintaining the material in a relatively dry condition. When the material is to be used, the door is opened by first operating pilot valve 112. This permits the pressure in chamber 22 to return to ambient pressure, thus eliminating the resistance from a pressure differential to the opening of the door. Likewise, when lid 50 after the vacuum in chamber 22 has been relieved. operation of solenoid plunger 56 which then lifts the lid 50 after the vauuum in chamber 22 has been relieved. If the moisture content in the air in chamber 22 and in the material placed in the apparatus rises to a predetermined level, the apparatus becomes operable again by the actuation of humidity sensing switch 104, and the apparatus then continues to cycle intermittently to maintain the humidity in the apparatus within the desired range.

A modified form of the present apparatus is illustrated in FIG. 4 in which the lamp is replaced by a unit consisting of a receptacle 140 containing silica gel 142 and having an electrical heating element 144 in the bottom thereof. The heating element is uonnected into electrical system 150 by leads 146 and 148. A thermostat preferably controls the operation of the heating element in the manner similar to that described with reference to the operation of lamp 84. When the humidity sensing switch 104 closes, heating element 144 becomes hot and raises the temperature of the silica gel sufficiently to drive off the moisture, which is dissipated through ports 42 and 44 while lid 50 is in its raised position. After the moisture has been driven from the silica gel and the moisture in the air in chamber 22 has been decreased to the desired level, the electrical system is automatically turned off and lid 50 is closed. Under this condition, the silica gel absorbs moisture from the air, thereby maintaining the air and the materials placed in the chamber 22 within the desired range of moisture content. The unit 140 may be located in the same position as the lamp or some other suitable position, such as beneath rack or tray 82, or mounted on one of the internal walls of the apparatus.

While only two embodiments of the present moisture extracting and drying apparatus have been described in detail herein, various changes and further modifications may be made to satisfy requirements.

I claim:

1. A moisture extracting and drying apparatus comprising a housing defining a chamber for materials to be conditioned, a door for said chamber, a vent means disposed in the upper portion of the housing and having an opening, a closure for said opening, a heat generating and vacuum creating means in said chamber, an electrically operated means for operating said closure including a means for relieving the vacuum in said chamber when said closure is to be opened, and an electrical control system for said heat generating means and said closure operating means including a thermostatically controlled switch and a humidity sensing switch responsive to the temperature and humidity of the air in said chamber, respectively.

2. A moisture extracting and drying apparatus as defined in claim 1 in which said heat generating means consists of an infra-red lamp lamp.

3. A moisture extracting and drying apparatus as defined in claim 2 in which the means for operating said closure consists of a solenoid.

4. A moisture extracting and drying apparatus as defined in claim 1 in which the means for operating said closure consists of a solenoid.

5. A moisture extracting and drying apparatus as defined in claim 3 in which said means for relieving the vacuum includes a pilot valve which opens before said closure is operated to relieve the vacuum in said chamber.

6. A moisture extracting and drying apparatus as defined in claim 5 in which said pilot valve is operated by said solenoid in advance of the opening operation of said closure by said solenoid.

7. A moisture extracting and drying apparatus as defined in claim 1 in which said housing is provided with a stack with said vent means disposed at the top thereof.

8. A moisture extracting and drying apparatus as defined in claim 1 in which a manually operated pilot valve means is connected with said chamber for relieving the vacuum therein before said door is opened, including an adjustment means for controlling the degree of vacuum in said chamber.

9. A moisture extracting and drying apparatus as defined in claim 1 in which said heat generating means includes a container of silica gel and an electrical heating element for driving off the moisture from said silica gel.

10. A moisture extracting and drying apparatus as defined in claim 1 in which an adjustable valve means communicating with ambient air controls the maximum vacuum obtainable in said chamber.

References Cited
UNITED STATES PATENTS

| | | | |
|---|---|---|---|
| 685,287 | 10/1901 | Mende | 34—92 XR |
| 2,119,320 | 5/1938 | Dobrowsky | 99—270 |
| 2,184,473 | 12/1939 | Scanlan | 34—46 |
| 2,268,986 | 1/1942 | Hess et al. | 34—46 XR |
| 2,396,474 | 3/1946 | Riley | 34—201 XR |
| 2,587,138 | 1/1952 | Gillon | 34—48 |
| 2,758,390 | 8/1956 | Munters | 34—80 |
| 2,920,398 | 1/1960 | Liljenstrom | 34—46 |

FREDERICK L. MATTERN, Jr., Primary Examiner

H. B. RAMEY, Assistant Examiner

U.S. Cl. X.R.

34—235; 99—246